United States Patent [19]

Coggins

[11] 4,115,084
[45] Sep. 19, 1978

[54] COMBINED SEPARATOR VESSEL AND GAS ABSORBER VESSEL

[75] Inventor: Robert Wayne Coggins, Tulsa, Okla.

[73] Assignee: Combustion Engineering, Inc., Windsor, Conn.

[21] Appl. No.: 826,285

[22] Filed: Aug. 22, 1977

[51] Int. Cl.² ............................................. B01D 19/00
[52] U.S. Cl. ........................................ 55/176; 55/199; 55/462
[58] Field of Search ......... 55/29, 32, 45, 51, 171–177, 55/199, 462

[56] References Cited

U.S. PATENT DOCUMENTS

| 2,735,506 | 2/1956 | Glasgow | 55/175 |
| 2,990,691 | 7/1961 | Glasgow | 55/174 X |
| 3,094,574 | 6/1963 | Glasgow et al. | 55/174 X |
| 3,789,583 | 2/1974 | Smith | 55/171 |

Primary Examiner—Charles N. Hart
Assistant Examiner—Richard W. Burks
Attorney, Agent, or Firm—Arthur L. Wade

[57] ABSTRACT

A gas-liquid separator vessel has mounted within its internal volume the adsorber tower of a dehydrator for the separated gas. The connections between the internal volumes of the two vessels are kept to minimum length, and heat exchange between the separating fluids and reconcentrated dessicant of the dehydrator is facilitated.

2 Claims, 2 Drawing Figures

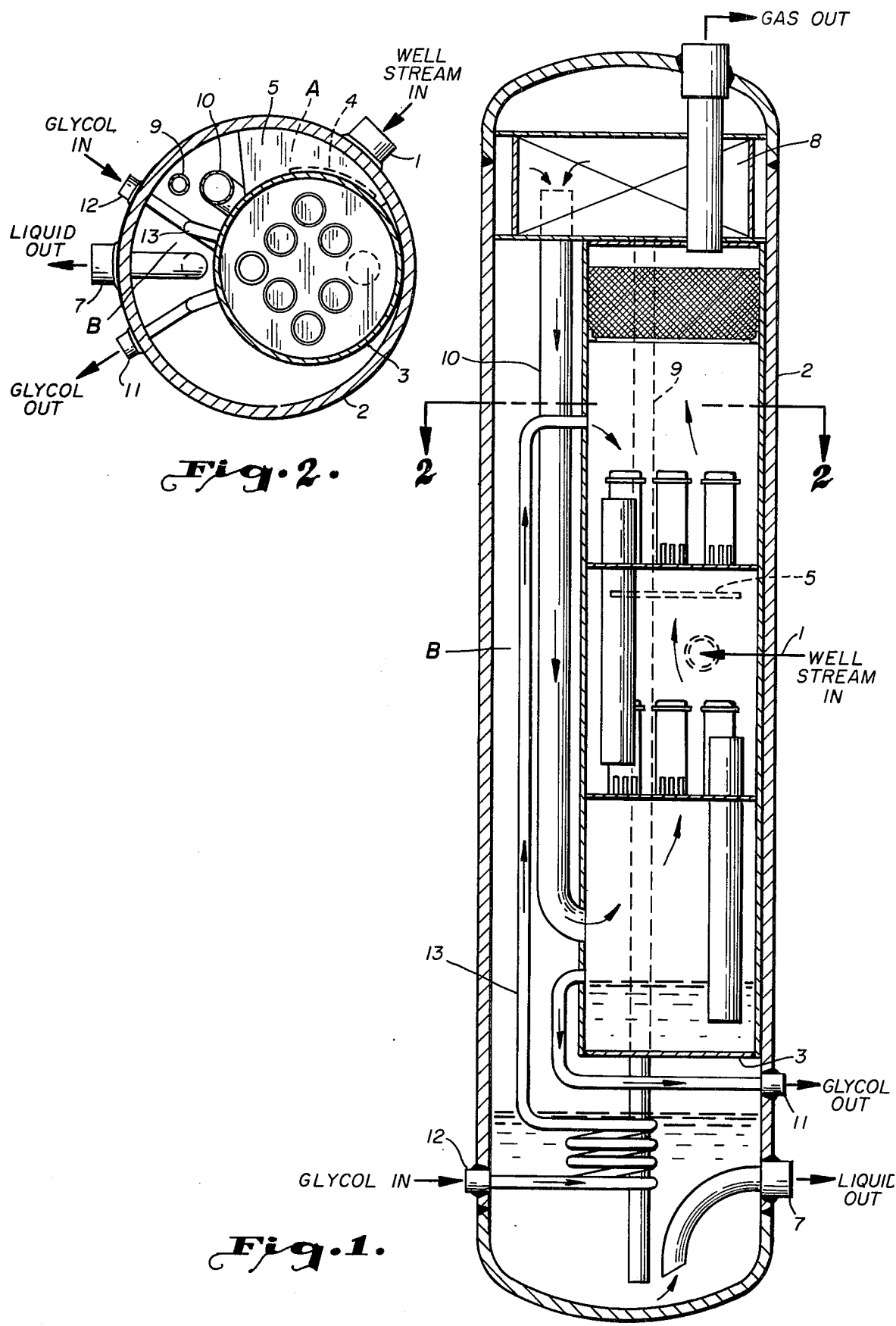

COMBINED SEPARATOR VESSEL AND GAS ABSORBER VESSEL

BACKGROUND OF THE INVENTION

The liquid dessicant gas dehydrator has been around the oil patch for decades. Glycol has been the preferred liquid dessicant from the beginning. Slowly the glycols have been improved to enable higher heat levels to boil off higher percentages of water the glycol absorbs from gas. Improvements to the absorber tower, in which the gas to be dried is contacted by the glycol, have been made in fits and starts. The reconcentrator for the glycol has also been improved over the years. A notable leap forward was made in "gas stripping" the gylcol, after thermal reconcentration, as disclosed in U.S. Pat. No. 3,105,748 Stahl issued Oct. 1, 1963.

Parallel with glycol dehydrator evolution, was concern with the low temperatures in the upstream gas-liquid separator as the high pressure of the streams produced from their wells was reduced toward the pressure values of transmission lines. Of course the conservationists puzzle over how to use the energy of the high pressure fluids released by the pressure reduction. A separate, well-identified section of the prior art was developed around this problem. But a very important concern to the oil field operator was with the hydrates and solidifying wax in his separator vessel as the temperature within the vessel dropped during the pressure reduction. The operator wanted heat to keep his fluid flowing through his separator toward the point of sales.

Separator vessels were moved downstream to the glycol dehydrator as a source of heat. U.S. Pat. No. 2,735,506 Glasgow issued Feb. 21, 1965 to represent this evolution. A common wall between the two vessels enabled the heated glycol being reconcentrated to transmit heat into the separating fluids of the separator vessel. This particular feature of the trend twenty years ago did not continue. However, within ten years a heated body of water was thermosiphonically circulated through a coil in the liquids of a gas-liquid separator. U.S. Pat. No. 3,119,674 Glasgow et al. issued Jan. 28, 1964 to represent these systems. It did not take long for those skilled in the art to pipe the heated glycol of the downstream dehydrator to the upstream gas-liquid separator. U.S. Pat. No. 3,206,916 Glasglow et al. issued Sept. 21, 1965 to represent this technology.

At the classic oil-field pace of thinking, the stage was set for the next combination of gas-liquid separator and liquid dessicant dehydrator. The workers in this particular art are on the move to find the structural combination which will reduce the complexity of the connecting concommitant vessels and at the same time utilize heat exchange between the fluids in the vessels to preserve and improve the process of separating the fluids and moving them to market. More specifically, there are many wells producing gas in the range of 250,000 scfd to 2 MM scfd with liquids having a range including 10 bbl/mm scf of gas. The pressure of production may be near 1550 psig and the temperature near 100° F. The transmission line pressure is in the neighborhood of 350 psig and the temperature desired is 60° F. to 80° F. The dewpoint depression required for the undersaturated gas is not severe: 70° to 80° depression. How can the separator vessel and part of the glycol dehydration system be combined to reduce the complexity of vessel interconnection and provide the heat of the reconcentrated dessicant to prevent hydrates and paraffin solidification in the separator vessel?

STATEMENT OF THE INVENTION

The present invention is embodied in a vessel with a volume sized to provide separation of a mixture of gas and liquids and room for a gas-liquid absorber of a gas dehydration system. The separated liquids of the mixture are collected in a body within the separator vessel and a conduit for reconcentrated dessicant is placed in contact with the separated liquids to prevent hydrate formation and collection as well as paraffin build-up within the separator vessel. The mixture of gas and liquid is conducted through the separator wall to impact on the external wall of the absorber vessel which deflects the gas and liquid of the mixture into separate paths within the separator vessel volume. The separator volume is sized to include all the impact structure required to continue the separation of the deflected fluids from each other. The conduit required to direct the separated gas into the absorber tower is internal the separator vessel.

Other objects, advantages and features of the invention will become apparent to those skilled in the art as the description, appended claims and drawings are considered.

DESCRIPTION OF THE DRAWINGS

FIG. 1 is a sectioned elevation of a liquid dessicant-gas contact vessel mounted within a separator vessel as included in a system in which the present invention is embodied; and FIG. 2 is a section along lines 2—2 in FIG. 1.

DESCRIPTION OF THE PREFERRED EMBODIMENT

This description will make no attempt to glamorize the invention with words and phrases calculated to distract those skilled in the art from the basic simplicity of the present invention. There is actually little choice in the language of this particular art from which to structure robust phrases. There is only the limited and simplistic terms such as separator vessel, absorber tower, connecting conduit, mist extractor, fluid flow, liquid collection, dehydration, hydrates and paraffin collections.

There is little in the way of a dramatic word and phrase arsenal from which to select and form telling descriptions that will ring out the solid advance this invention makes within the art. Therefore, if words of persuasive bite be unavailable, those that are selected will be clear and definite to trace the periphery of the scope of the invention in the following description of the drawings.

In FIG. 1 there is disclosed a vessel within a vessel. A predominately gaseous well stream is flowed (produced) through conduit 1 which is connected to separator vessel 2. An absorber tower vessel 3 is mounted within vessel 2. The volume of vessel 2 is sized to provide a volume large enough for the fluids of conduit 1 to separate within it and contain the absorber tower as well.

BASIC GAS-LIQUID SEPARATION

Those skilled in the art are presumed familiar with the elemental requirements for separation of the liquids and gas of a well stream. In application of the present embodiment of the invention, it is expected that the well stream will flow from the well with a relatively high pressure range which includes 1500 psig. It is expected that the temperature of the mixture will be in a range including 100° F. A valve, generally referred to as a choke, is usually incorporated in conduit 1. Across this valve, the pressure at the well is reduced toward the lower pressure of the transmission line to which the output conduit of the two vessels of the embodiment is connected.

The well fluids are produced into vessel 2 at a relatively high velocity. It is not necessary to be specific about the value of this velocity in disclosing the invention. The pertinent disclosure is that this flow stream of fluids is directed against an impact surface within vessel 1. This impact surface absorbs flowing energy of the stream and initiates separation of the gaseous components of the mixture from its liquid components.

The external wall of tower 3 is mounted and arranged to function as the impact surface for the incoming well fluids. An additional thickness of plate 4 (FIG. 2) is prudently provided at the area of impact. Deflected by this plate 4, the gaseous components will "break-out" from the liquids and follow a path which is generally upward. The remaining liquid components will follow a path which is generally downward, being more dense than the gas.

The impacting of the fluids will develop a degree of turbulence. Much of their energy may be absorbed by plate 4. Splash plate 5, above the plate 4, is sized and arranged to militate against splashing, turbulent liquid of the flow stream taking an upward path and entraining itself in the gas going to the upper portion of separator 2.

Tower 3 could be placed at any of a number of positions within separator vessel 2. In the vertical form of vessels disclosed in the drawings, vessel 3 is generally of cylindrical shape and its vertical axis positioned a horizontal distance from the vertical axis of separator vessel 2. The flow stream is directed into vessel 2 at a point where the two vessels are relatively close together. The separating components of the stream will be deflected toward the enlarging volume provided within the separator vessel 2. This enlarging volume will cause the velocity of the well stream fluids to decrease, and gravitational forces will flow the gas up and the liquids down.

Volume and residence time have been key factors in gas-liquid separation in the oil field. If the mixture is flowed into a vessel which is large enough and the mixture remains there long enough, separation of the components will take place. This has been a guiding principle in designing oil field separation equipment. The present invention includes this principle.

What the present invention specifically provides under the principle, are spiral paths for the fluids from a locus of relatively small volume into a locus of relatively large volume. FIG. 2 discloses the vertical axis of dessicant tower 3 horizontally positioned a distance from the vertical axis of separator vessel 2. Conduit 1 is connected through the wall of vessel 2 to deliver its mixture into volume A. The flow of the separating fluids will be toward volume B. If the total volume provided is sized correctly, the residence time resulting will enable gravity to divide the gas from the liquids of the mixture. The gas will flow upward and the liquids will join the collection 6 in the lower portion of vessel 2.

Little else can be instructively declared, or explained, about the separated liquids. They collect in body 6 and are withdrawn through conduit 7. The liquid flow through conduit 7 is regulated by a conventional control system to maintain the level of the body 6 within a predetermined range.

MIST EXTRACTION

As for the gases, or vapors, which flow upward from basic separation from the liquids, they will still entrain some liquids. Additional liquid entrained by the gases may be removed by further contact with surfaces on which the liquid drops will collect and from which they will flow to the body 6. It is common to provide a tortuous path for gases with entrained liquids through a body containing surfaces on which the liquid drops will impact and collect. This tortuous path structure is generally termed a mist extractor in this art.

A mist extractor may be placed in various portions of the upwardly spiralling path of the gas, or vapor. It has been found, in the present disclosure, convenient to locate the extractor 8 near the upper end of separator 2. The full cross-sectional area of the vessel 2 is thereby utilized to form extractor 8 and give the ascending, separated, gas as lengthy a flow path through the extractor as reasonably possible. The liquids scrubbed from the entraining vapors can then be collected and flowed downward through conduit 9 to body 6. The gas, denuded of liquids to the limit of the capabilities of the mist extractor structure, can then be routed through the absorber tower 3.

DEHYDRATION OF SEPARATED GAS

In function, absorber tower 3, is no more, and no less, than what can be expected of a gas-liquid contact structure. Liquid dessicant is flowed down through the tower, and the separated gas is flowed up through the tower. If the gas-liquid contact is designed correctly, the dessicant absorbs the required amount of water from the gas. Novelty in the present disclosure is found in the arrangement of mounting the tower 3 within the volume of separator 2. It has been disclosed how this mounting provides the external wall of tower 3 as a support for the impact structure for the mixture from conduit 1. This is only one of the advantages of this combination of vessel 2 and tower 3.

Next, it is evident that placing all of tower 3 within the shell of separator 2 shortens all conduit connections between the two vessels to a minimum. The principal connection is conduit 10 for gas to be dehydrated. This conduit routes the separated gas from the top of separator shell 2 to the lower portion of tower 3. This conduit could hardly be shorter and more simple to arrange with the absorber tower 3 mounted within the shell of separator 2. For example, only one wall (inner wall of tower 3) has to be penetrated in extending conduit 9 from the gas in the top of vessel 2 to the bottom of tower 3.

Another problem solved by this vessel-within-a-vessel arrangement is that of heating the separated fluids. It is to be recalled that the well pressure of the fluid mixture is greatly reduced as it enters the separator vessel. Adiabatic cooling results from this pressure reduction. The temperature of the fluids within the separator vessel could lower until hydrates form and/or paraffin solidifes from the well stream. Obviously these solid materials can mechanically clog, or plug, the conduits and passages of the separator vessel. A source of heat is needed to prevent this accumulation. Specifically, heat is required to control the formation of hydrates and paraffin solidification. The tower 3, and its supply of heated dessicant, is the solution to this problem offered by this disclosure.

The dessicant, usually glycol, is used to absorb moisture from gas passed through it. This gas-dessicant contact is within tower 3. The glycol is then reconcentrated. The water is driven out of it. This process, and apparatus for carrying it out, is well known and need not be shown in this disclosure. It is sufficient, for this disclosure, to merely indicate that the wet, or rich, glycol is routed by conduit 11 from tower 3. The rich glycol is reconcentrated and returned as lean, dry, hot, glycol to tower 3 by conduit 12.

Arrangements for salvaging heat from lean glycol, back into the reconcentrator, are well known in the art. However, the dessicant still arrives at tower 3 with the temperature elevated enough to make it a very important source of heat for the fluids of separator 2. Therefore, the conduit 12 is connected through the wall of separator 2 and extended through the liquid body 6 in the lower portion of separator 2. The extension of conduit 12, within separator 2, is designated 13. Conduit 13 is formed with as many reaches as necessary to provide the surface to transfer sufficient heat into the liquid body 6 to prevent solidification of paraffins from the separated liquids.

Conduit 13 can be extended directly to the upper portion of tower 3 to begin the downflow of the glycol in contact with the upflowing gas. It is also conceived that, if heating potential remains in the glycol, lengths of conduit 13 could be arranged anywhere in the separator where heat is needed to melt, or prevent the formation of, hydrates.

If the glycol arrives at the upper portion of tower 3 with heating potential remaining, after its other heating duties, the entire tower 3 will become a heat source within separator 2. All of the gas, separated from the liquids, can be described as in heat exchange contact with tower 3. Therefore, the hot, lean, glycol is fully utilized to control the temperature of the gas and liquids within the separator as it flows through conduit 13 and down through tower 3.

The function of tower 3 in bringing the glycol into contact with the separated gas is straight forward. The glycol can be flowed down over trays or packing. The tray structure is indicated in FIG. 1. The water-rich glycol flows from tower 3 in conduit 11. The dehydrated gas flows from the top of tower 3 through a mist extractor 14 and in conduit 15.

CONCLUSION

In relatively small gas wells, this combination of a separator and dehydrator tower will be an inexpensive package which can be readily fabricated and require little maintenance. By relatively small is meant wells producing 4 MM scfd, and under, in which there is only about 10 bbl/thousand scf of liquids. All of the absorbing tower, and its connections to the fluids of the system, are mounted in the shell of the separator vessel. The heat of the regenerated glycol is utilized completely to control hydrates and paraffin within the separator. The package becomes a unique combination of structure with old functions around which heat is more fully utilized and connections between structure are simplified.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth as shown in the accompanying drawings is to be interpreted in an illustrative and not in a limiting sense.

The invention, having been described, what is claimed is:

1. A separation and dehydration system for a mixture of gas and liquid including,
    a vertically extended cylindrical separator shell,
    the vertically extended cylindrical absorber tower of a liquid dessicant system mounted within the separator shell with its vertical axis horizontally displaced from the axis of the separator,
    a conduit connected through the separator shell to conduct a mixture of gas and liquid from a source and to direct the mixture into impact upon the external wall of the tower to initiate separation of the gas and liquid,
    a first path for the separated gas extended between the impact area and the upper volume within the separator shell,
    a second path for the separated liquid extended from the impact area to the lower volume within the separator shell,
    a body of liquid in the lower volume within the separator shell arranged at the end of the second path to receive the separated liquid from the second path,
    a conduit extended from the upper volume within the separator shell to the lower volume within the absorber tower for the separated gas,
    a source of hot lean liquid dessicant connected to the upper volume within the absorber tower,
    whereby the absorber tower functions as a source of heat within the separator to control hydrate formation and paraffin solidification within fluids flowing through the separator in which separated gas is contacted directly by the dessicant to dehydrate the gas.

2. The separation and dehydration system of claim 1 wherein,
    the conduit for the mixture of gas and liquid from its source is connected through the wall of the separator shell at a point where the external wall of the tower and the internal wall of the separator shell are near each other so the fluid mixture impacting on the wall of the tower is deflected toward the enlarged portion of the volume between the two walls and separates into gas and liquid.

* * * * *